Patented Nov. 29, 1938

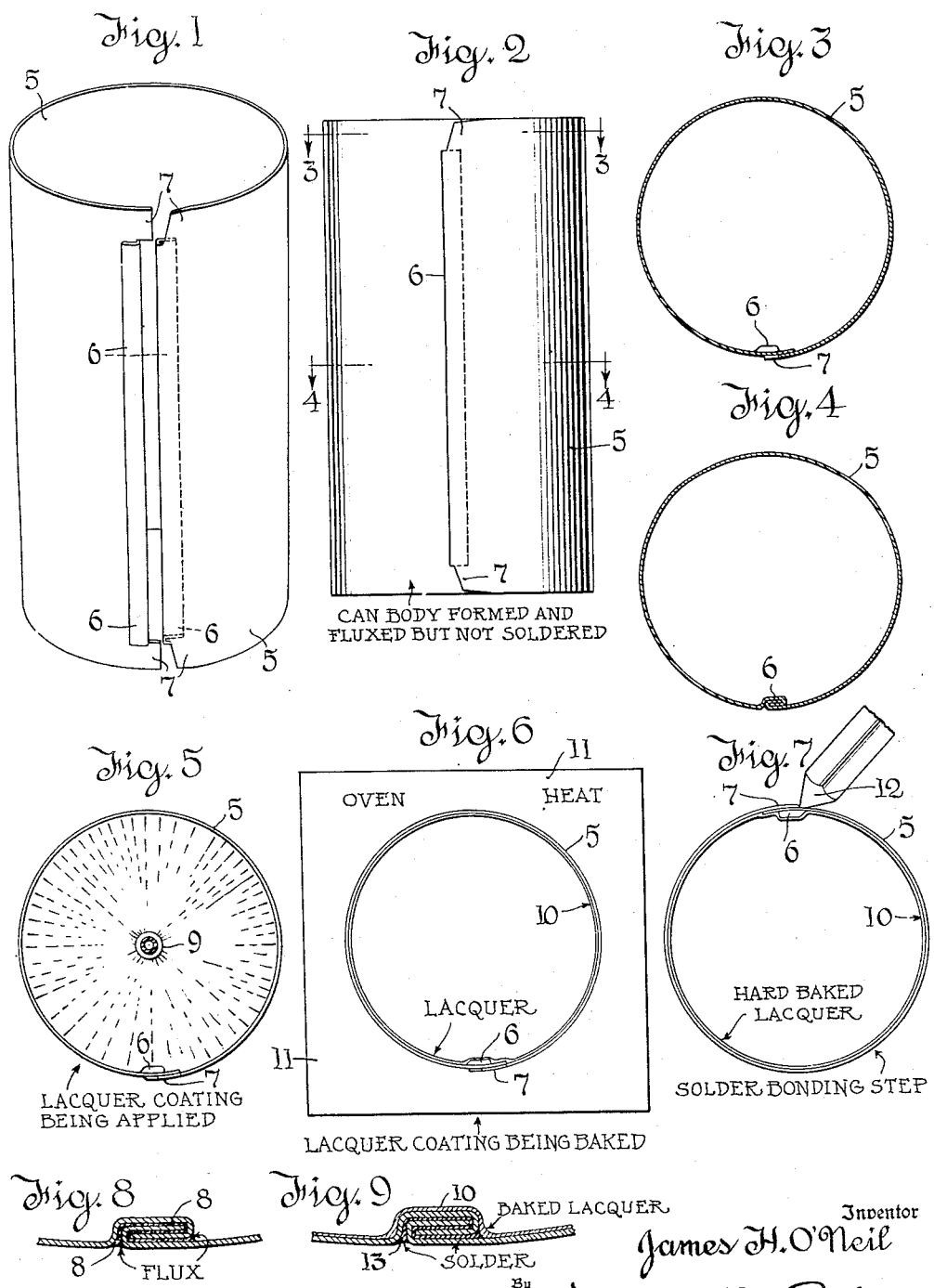

2,138,807

UNITED STATES PATENT OFFICE 2,138,807

METHOD OF MAKING ENAMELED CAN BODIES

James H. O'Neil, Syracuse, N. Y., assignor to Continental Can Company, Inc., New York, N. Y., a corporation of New York Application October 16, 1936, Serial No. 106,016

2 Claims. (Cl. 113—120)

The invention relates generally to the art of manufacturing metal containers or cans in which fruits, vegetables or beverages are preserved for future use, and seeks to provide a novel method of interiorily coating or lining the cans in a manner for preserving the contained products more efficiently and with greater certainty than heretofore.

It has been the practice heretofore to lacquer the tin plate in the flat, after which it is formed into a can body on a body maker and then soldered. During the bumping operation of the side seam in the body maker the lacquered surface often breaks. Efforts have been made to cure the defects in the lacquering surface incident to the forming of the side seam by spraying the inner surface of the can body after the seam is formed and solder bonded. It is necessary under these conditions to use a lacquer which is of a relatively low baking temperature so as not to disturb the solder bond during baking.

The objections noted above are all avoided by my novel method of making cans or similar containers preferably of the lock and lap seam type, which method consists in first forming and fluxing the cans without solder bonding the seams, the applying the lacquer interior coating or lining, then subjecting the can to a hard baking temperature, and thereafter solder bonding the can seams. By this method hard baked interior coatings or linings are obtainable which are free from side seam abrasions and which fully protect the contained products.

With the above and other objects in view that will hereinafter appear, the invention still further resides in the novel steps or acts or series of steps or acts first fully described in the following detailed description, then particularly pointed out in the appended claims, and illustrated in the accompanying drawing.

In the drawing:

Figure 1 is a perspective view of a can body of the lock and lap seam type with the seam spread or disconnected;

Fig. 2 is a side elevation of a can body of the type shown in Fig. 1, formed and fluxed but not solder bonded;

Figures 3 and 4 are horizontal cross sections taken respectively on the lines 3—3 and 4—4 on Fig. 2;

Fig. 5 is an end elevation diagrammatically illustrating the step of interiorly coating or lining the can body;

Fig. 6 is an end elevation diagrammatically illustrating the step of "hard baking" the interior coating or lining;

Fig. 7 is an end elevation diagrammatically illustrating the step of "solder bonding";

Fig. 8 is an enlarged detail cross section of the side seam shown in Fig. 4, fluxed but not solder bonded, and Fig. 9 is an enlarged detail cross section of the solder bonded side seam.

In the drawing, I have illustrated the several steps of my improved method as practiced in the making of a can of the well known lock and lap seam type which includes the body 5 and the lock portions 6 and lap portions 7 comprising the side seam. It is to be understood, however, that the invention is not limited in scope to the making of cans of the particular type stated.

The can body is formed as shown in Figures 1 to 4 of the drawing, the lock and lap seam 6, 7 being fluxed at 8 as shown in Figure 8 but not solder bonded.

Thus formed the can is interiorly coated or lined with a hard baking lacquer. This coating may be applied in any approved manner such as by flooding, or by spraying as diagrammatically illustrated at 9 in Figure 5. The applied coating is indicated at 10.

After the coating or lining 10 is applied it is subjected to a hard baking temperature. This may be accomplished by placing the coated can body in a baking oven diagrammatically indicated at 11 in Figure 6.

The can thus formed, fluxed and equipped with its hard baked coating or lining has its seam solder bonded as diagrammatically indicated at 12 in Figure 7. The solder by which the bond is formed is indicated at 13 in Figure 9.

Body makers capable of forming the lock and lap seam can depicted as an example in this disclosure, and the functions thereof, are well known to workers in the art and need not be described in detail herein. This is true also with respect to the soldering step which may be carried out in any approved manner but preferably by passing the can over a well known Jensen soldering roll. Examples of adaptable mechanisms are to be found in the patent disclosure of Troyer 1,772,820, issued August 12, 1930.

By solder bonding after, instead of before, the lacquer application and baking steps, it is possible to "hard bake" the lacquer without any fear of disturbing a solder bond, and thus the can is definitely protected from surface scratches and seam abrasions which would provide dangerous freedom of contact between bare body or seam metal portions and the products contained within the can.

Having thus described my invention, what I claim to be patentably novel and desire to have protected by Letters-Patent, is—

1. The method of making can bodies consisting in forming a cylindrical body having interengaged hooks and fluxing the interengaging hook portions interiorly coating the can body with a hard baking lacquer, applying heat to the lacquer for baking the same and thereafter applying molten solder to the interengaged hooks exteriorly of the can body for solder bonding said hooks.

2. The method of making can bodies which consists in providing a cylindrical body having a side seam to which flux has been applied, coating the interior of the body with a hard baking lacquer, applying heat to the lacquer for baking the same and subsequently applying solder to the seams from the exterior of said body for solder bonding the same.

JAMES H. O'NEIL.